US012633062B2

(12) United States Patent
Okamoto

(10) Patent No.: US 12,633,062 B2
(45) Date of Patent: May 19, 2026

(54) SYSTEM AND METHOD FOR MANAGING A VIRTUAL OBJECT

(71) Applicant: CANON KABUSHIKI KAISHA, Tokyo (JP)

(72) Inventor: Hiroyuki Okamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 18/180,044

(22) Filed: Mar. 7, 2023

(65) Prior Publication Data

US 2023/0298286 A1    Sep. 21, 2023

(30) Foreign Application Priority Data

Mar. 15, 2022    (JP) ................................. 2022-039856

(51) Int. Cl.
| | |
|---|---|
| *G06T 19/00* | (2011.01) |
| *G02B 27/01* | (2006.01) |
| *G06F 3/14* | (2006.01) |
| *G06V 10/44* | (2022.01) |

(52) U.S. Cl.
CPC ........ *G06T 19/006* (2013.01); *G02B 27/0172* (2013.01); *G06F 3/14* (2013.01); *G06V 10/44* (2022.01)

(58) Field of Classification Search
CPC .. G06T 19/006; G02B 27/0172; G06V 10/44; G06V 20/20; G06F 3/14; G06F 3/1423; G06F 3/1454; G09G 2340/10; G09G 2370/04; G09G 2370/20
USPC ........................................................ 345/633
See application file for complete search history.

(56) References Cited

U.S. PATENT DOCUMENTS

| | | | | |
|---|---|---|---|---|
| 10,848,335 B1 * | 11/2020 | Roche | ................... | G06V 20/20 |
| 2013/0088516 A1 | 4/2013 | Ota et al. | | |
| 2017/0287218 A1 * | 10/2017 | Nuernberger | ....... | G06F 3/04845 |
| 2018/0024362 A1 | 1/2018 | Williamson | | |

FOREIGN PATENT DOCUMENTS

| | | |
|---|---|---|
| CN | 106485609 A | 3/2017 |
| CN | 112104593 A | 12/2020 |
| CN | 113412479 A | 9/2021 |
| CN | 113597632 A | 11/2021 |

(Continued)

OTHER PUBLICATIONS

Pascal Kowalczuk et al., Cognitive, affective, and behavioral consumer response to augmented reality in e-commerce: A comparative study, Journal of Business Research, 124, (2021) pp. 357-373, Jan. 2021.

(Continued)

*Primary Examiner* — Jacinta M Crawford
(74) *Attorney, Agent, or Firm* — Canon U.S.A., Inc. IP Division

(57) ABSTRACT

A system for managing a virtual object includes a management unit configured to manage a virtual object by associating a feature amount, with identification information about the virtual object, in a real world for displaying the virtual object in association with the real world, wherein the management unit further associates, with the identification information about the virtual object, a parameter used for controlling a display relative to another virtual object when the virtual object is provided, to manage the virtual object.

16 Claims, 13 Drawing Sheets

(56)　　　　　　References Cited

FOREIGN PATENT DOCUMENTS

| | | | |
|----|------------|-----|---------|
| JP | 2011242934 | A | 12/2011 |
| JP | 2014071663 | A | 4/2014 |
| JP | 2015118578 | A | 6/2015 |
| WO | 2020202747 | A1 | 10/2020 |

OTHER PUBLICATIONS

Yan Hailong et al., Research in Issues of Model Instability in Augmented Reality Systems, Computer Knowledge and Technology, vol. 17, No. 36, Dec. 2021.

* cited by examiner

VIRTUAL OBJECT
MANAGEMENT SYSTEM

~121

~100

101

~102

~131

~132

~133

CLIENT TERMINAL
(HEAD-MOUNTED DISPLAY)

CLIENT TERMINAL
(SMARTPHONE)

CLIENT TERMINAL
(HEAD-MOUNTED DISPLAY)

FIG.9A

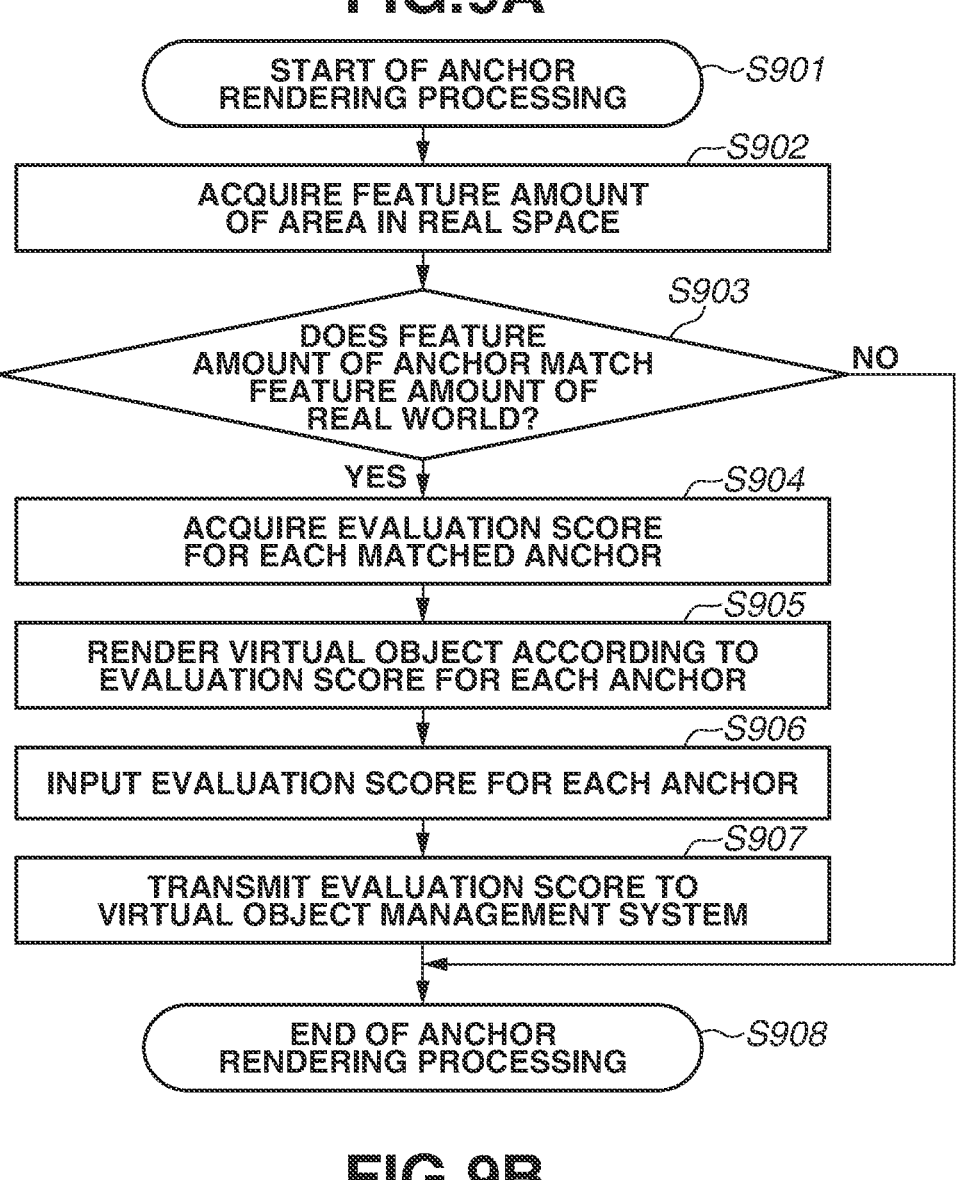

START OF ANCHOR
RENDERING PROCESSING — S901

ACQUIRE FEATURE AMOUNT
OF AREA IN REAL SPACE — S902

DOES FEATURE
AMOUNT OF ANCHOR MATCH
FEATURE AMOUNT OF
REAL WORLD? — S903

NO

YES

ACQUIRE EVALUATION SCORE
FOR EACH MATCHED ANCHOR — S904

RENDER VIRTUAL OBJECT ACCORDING TO
EVALUATION SCORE FOR EACH ANCHOR — S905

INPUT EVALUATION SCORE FOR EACH ANCHOR — S906

TRANSMIT EVALUATION SCORE TO
VIRTUAL OBJECT MANAGEMENT SYSTEM — S907

END OF ANCHOR
RENDERING PROCESSING — S908

FIG.9B

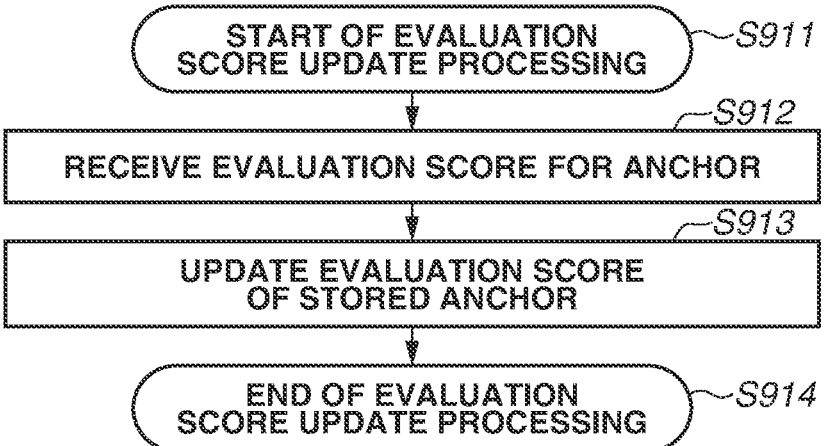

START OF EVALUATION
SCORE UPDATE PROCESSING — S911

RECEIVE EVALUATION SCORE FOR ANCHOR — S912

UPDATE EVALUATION SCORE
OF STORED ANCHOR — S913

END OF EVALUATION
SCORE UPDATE PROCESSING — S914

Figures 10A, 10B:
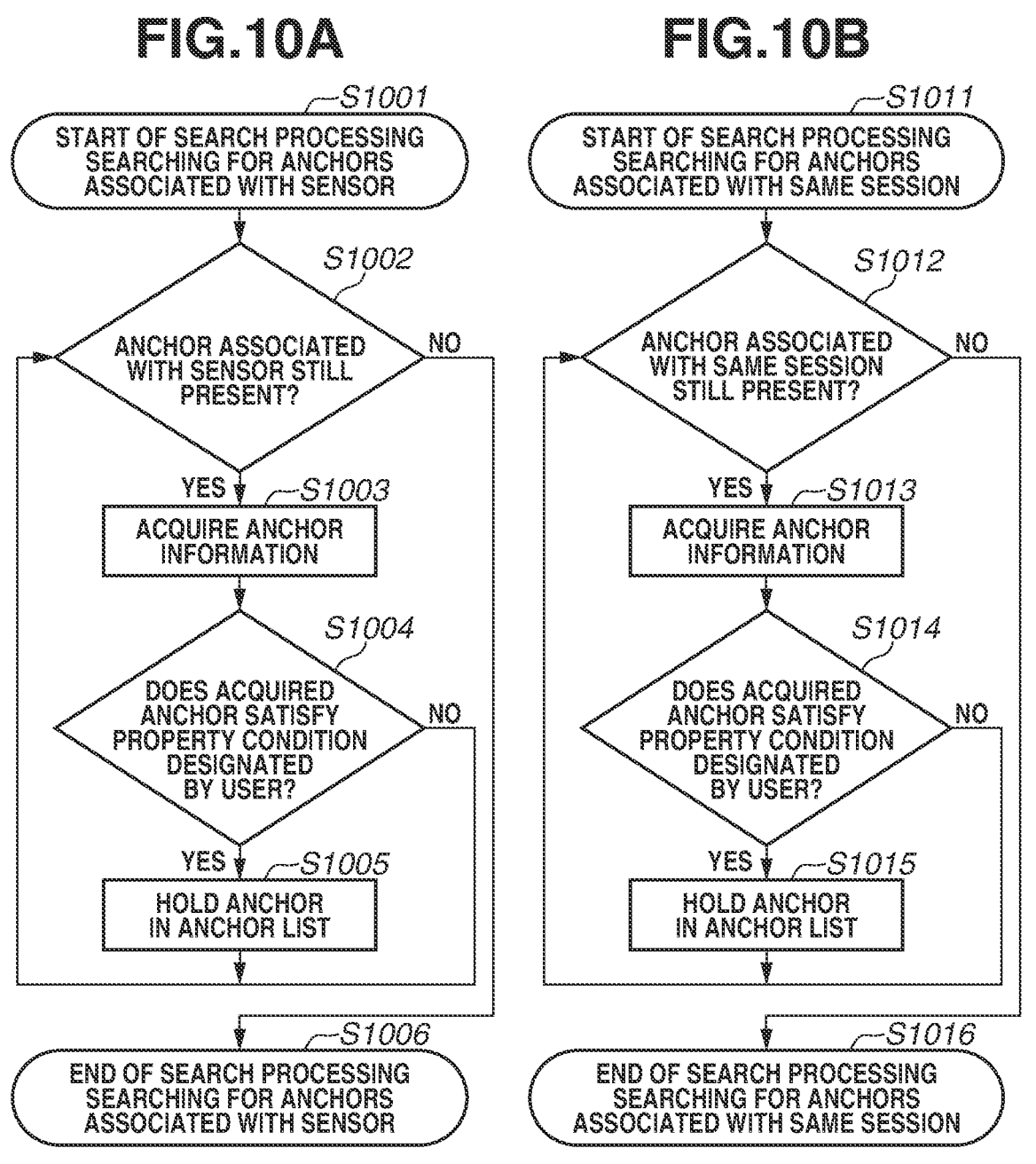

START OF SEARCH PROCESSING
SEARCHING FOR ANCHORS
ASSOCIATED WITH SENSOR

*S1002*

ANCHOR ASSOCIATED
WITH SENSOR STILL
PRESENT?          NO

YES    *S1003*

ACQUIRE ANCHOR
INFORMATION

*S1004*

DOES ACQUIRED
ANCHOR SATISFY
PROPERTY CONDITION
DESIGNATED
BY USER?          NO

YES    *S1005*

HOLD ANCHOR
IN ANCHOR LIST

*S1006*

END OF SEARCH PROCESSING
SEARCHING FOR ANCHORS
ASSOCIATED WITH SENSOR

START OF SEARCH PROCESSING
SEARCHING FOR ANCHORS
ASSOCIATED WITH SAME SESSION

*S1012*

ANCHOR ASSOCIATED
WITH SAME SESSION
STILL PRESENT?          NO

YES    *S1013*

ACQUIRE ANCHOR
INFORMATION

*S1014*

DOES ACQUIRED
ANCHOR SATISFY
PROPERTY CONDITION
DESIGNATED
BY USER?          NO

YES    *S1015*

HOLD ANCHOR
IN ANCHOR LIST

*S1016*

END OF SEARCH PROCESSING
SEARCHING FOR ANCHORS
ASSOCIATED WITH SAME SESSION

*1101*     *1102*

*131*

*1111*     *1112*

*133*

*1121* *1123*  *1122*  *1124*

B  A  C

*133*

*1131* *1133*  *1132*  *1134*

B  A  C

*133*

FIG.11E
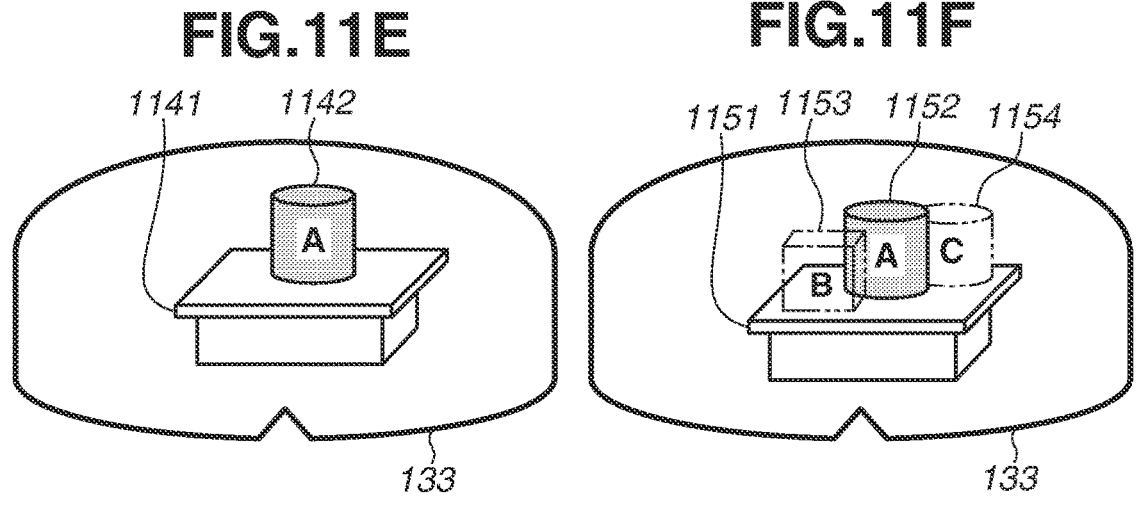
FIG.11F
FIG.11G
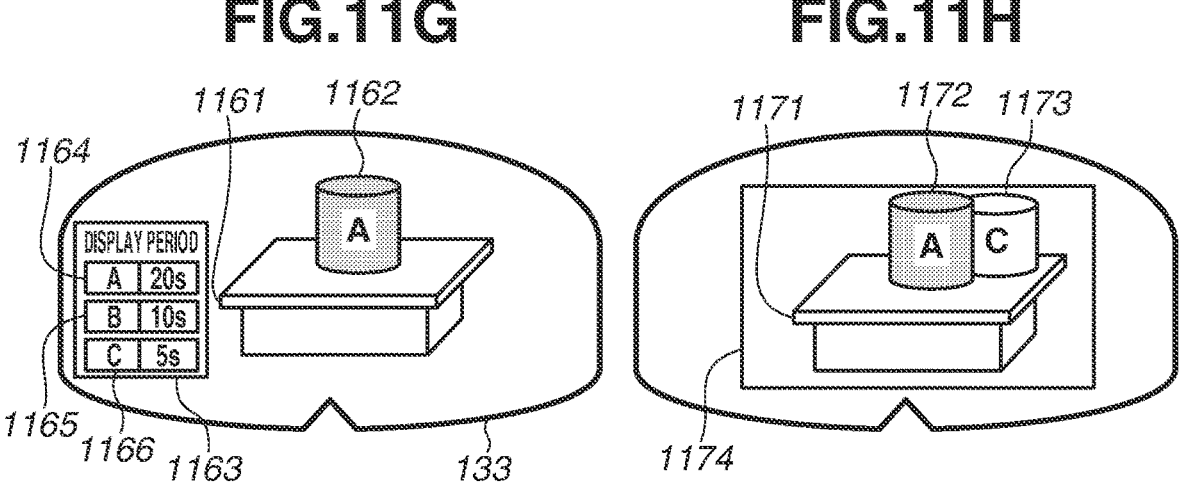
FIG.11H

SYSTEM AND METHOD FOR MANAGING A VIRTUAL OBJECT

BACKGROUND

Field

The present disclosure relates to a technology for displaying a virtual object in a real world used in Augmented Reality (AR) or Mixed Reality (MR).

Description of the Related Art

Cross reality (XR) is attracting attention, and ongoing tasks of various standardizations are performed. The XR technology is sometimes referred to as "Extended Reality". XR is a general term for a technique of integrating a real world and a virtual world to create a space for providing a simulated experience, such as Augmented Reality (AR) and Mixed Reality (MR). In these days, a system for displaying a virtual object at a same position in a real world on a plurality of terminals is realized on platforms provided by various manufacturers. For example, there are cloud systems that associate and manage a virtual object to be placed in a real world and a feature amount of the real world captured by a camera. Then, a camera of an arbitrary terminal may capture a real world with a feature amount matching the feature amount managed by the system such that the virtual object managed in association with the feature amount can be viewed on the terminal.

Association information associating the virtual object and the feature amount of the real world captured by a camera or the like is sometimes referred to as an anchor.

In Japanese Patent Application Laid-open No. 2015-118578, a display of a specific virtual object is switched using behavior information about a user or physical environment information. For example, a virtual object of a simple globe, which is a blue spherical object, is displayed first, but when a user comes near or looks at the virtual object, the display is switched to a detailed land feature.

In Japanese Patent Application Laid-open No. 2015-118578, a display control between a plurality of virtual objects based on the behavior information about the user or the physical environment information is not taken into consideration.

For example, when a plurality of users each places a virtual object at a same position in the real world (e.g., popular spot in a city), a plurality of virtual objects may be displayed at the same position in a random manner. There may be a possibility that a virtual object that each user desires to show cannot be provided as desired, or a virtual object that each user desires to see cannot be seen.

SUMMARY

According to an aspect of the present disclosure, a system for managing a virtual object includes a management unit configured to manage a virtual object by associating a feature amount, with identification information about the virtual object, in a real world for displaying the virtual object in association with the real world, wherein the management unit further associates, with the identification information about the virtual object, a parameter used for controlling a display relative to another virtual object when the virtual object is provided, to manage the virtual object.

Further features of the present disclosure will become apparent from the following description of exemplary embodiments with reference to the attached drawings.

BRIEF DESCRIPTION OF THE DRAWINGS

FIGS. 9A and 9B are flowchart illustrating processing flows of rendering virtual objects to be performed by a client terminal according to a second exemplary embodiment.

FIGS. 10A and 10B are flowcharts each illustrating a processing flow of searching for anchors to be performed by a virtual object management system according to the second exemplary embodiment.

FIGS. 11A to 11H are screen examples displayed on the client terminal according to the first exemplary embodiment.

DESCRIPTION OF THE EMBODIMENTS

Exemplary embodiments of the present disclosure will be described with reference to the attached drawings.

Figure 1:
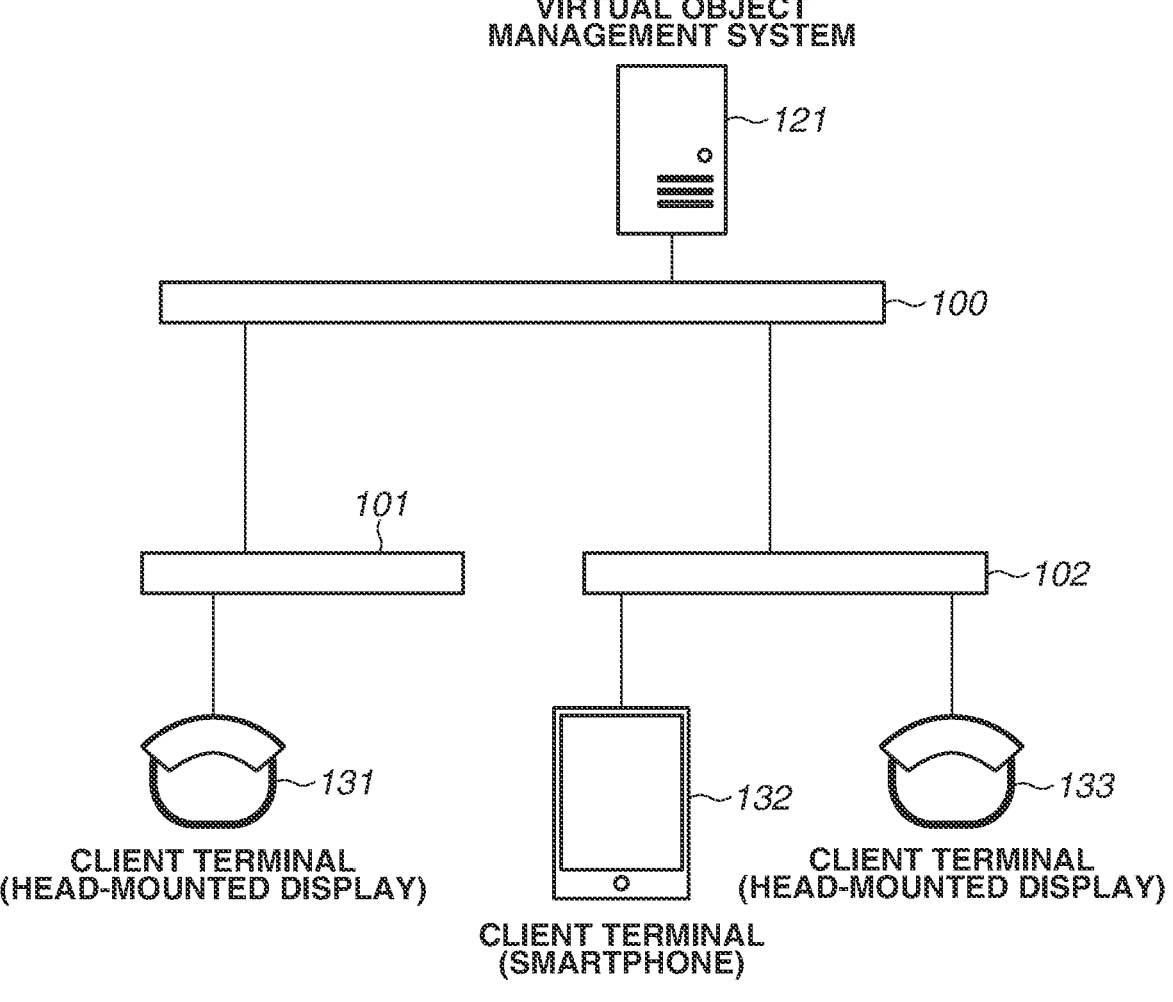
FIG. 1 is a diagram schematically illustrating an overall configuration of a virtual object management system according to a first exemplary embodiment.

FIG. 1 is a diagram schematically illustrating an overall configuration of a virtual object management system 121 according to a first exemplary embodiment.

In FIG. 1, the virtual object management system 121 is connected to client terminals 131 to 133 via the networks 100 to 102. Each of the networks 100 to 102 is a so-called communication network implemented by, for example, a local area network (LAN) and a wide area network (WAN) constructed using the Internet, a telephone line, a dedicated digital line, an asynchronous transfer mode (ATM) line, a frame relay line, a cable television line, and a wireless line for data broadcasting. The networks 100 to 102 only need to be capable of data transmission and reception. In the present exemplary embodiment, the network 100 is the Internet, and each of the networks 101 and 102 is the Internet, a network in an ordinary home or an office, or a wireless LAN installed in a city.

Each of the client terminals 131 to 133 is dedicated hardware capable of rendering a virtual object used in cross reality (XR), such as a head-mounted display (HMD) and smart glasses, or a portable telephone with an execution environment of programs built in, such as a smart phone. Each of the client terminals 131 to 13 is provided with a camera for capturing an image of the surrounding area, and a display for displaying a virtual object. Each of the client terminals 131 to 133 captures an image of the surrounding area through the camera, and renders and projects, on the display, a virtual object in the real world in an overlapped manner to provide, to each user, a simulated experience with the real world and the virtual world integrated. In a case where the client terminals 131 to 133 are not dedicated hardware such as a smartphone, the rendering of the virtual object is performed using a web browser or an application programming interface (API) provided by an operating system (OS).

The virtual object management system 121 is a system for providing, for example, a service for associating and managing a virtual object to be placed in a real world and a feature amount of the real world captured by a camera, and a service for providing the virtual object to external terminals.

The virtual object management system 121 can be formed using a server computer. The virtual object management system 121 can also be formed by employing a cloud computing technology or the like.

In the present exemplary embodiment, association information associating a virtual object and a feature amount of a real world captured by a camera, and managed by the virtual object management system 121, is hereinbelow referred to as an anchor. Other than the information described above, the association information includes, as will be described below, an anchor identifier for identifying the anchor itself, a session identification (ID), and property information including various kinds of parameters.

The virtual object management system 121 receives an anchor registration request from any of the client terminals 131 to 133, and stores the registered anchor. The virtual object management system 121 receives an anchor acquisition request from any of the client terminals 131 to 133, and returns, as a response, an anchor satisfying a condition from among the stored anchors.

The function of the server computer included in the virtual object management system 121 may be formed of a single server or a single virtual server, or may be formed of a plurality of servers or a plurality of virtual servers. Alternatively, a plurality of virtual servers may be executed on a single server.

Figure 2:
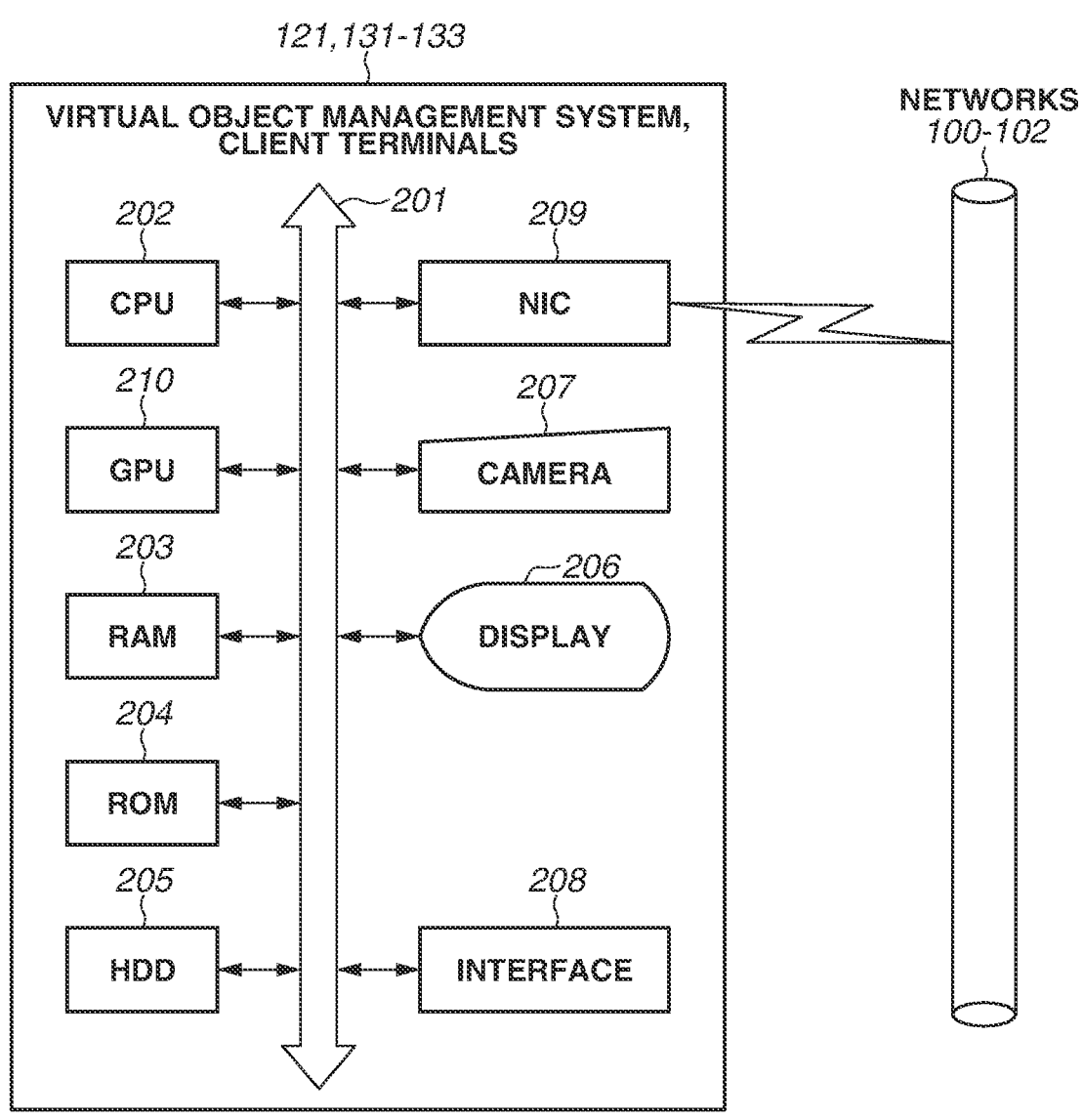
FIG. 2 is a block diagram illustrating a hardware configuration common to a server computer included in the virtual object management system, and client terminals according to the first exemplary embodiment.

FIG. 2 is a hardware configuration diagram common to the virtual object management system 121 and the client terminals 131 to 133 according to the present exemplary embodiment.

In FIG. 2, a central processing unit (CPU) 202 controls the entire apparatus. The CPU 202 executes an application program, an operating system (OS), and the like stored in a hard disk drive (HDD) 205, to temporarily store information required for executing the programs, files, and the like in a random access memory (RAM) 203. A graphics processing unit (GPU) 210 performs arithmetic processing required for rendering a virtual object on a real-time basis. A read only memory (ROM) 204 is a storage unit for storing various kinds of data such as a basic input/output (I/O) program. The RAM 203 is a temporary storage unit functioning as a main memory or a work area for each of the CPU 202 and the GPU 210. The HDD 205 is one of external storage units to function as a large-capacity memory for storing application programs such as a Web browser, programs for a service server group, the OS, associated programs, and the like. A display 206 is a display unit for displaying a virtual object and information required for operation. An interface 208 is an external apparatus interface to connect to peripheral devices, such as various kinds of external sensors. A camera 207 is mounted in each of the client terminals 131 to 133 to capture an image of the surrounding area thereof. By analyzing the image captured by the camera 207 using the application program stored in the HDD 205, it is possible to place the virtual object in the real world in an overlapping manner, and to calculate the feature amount of the real world. In a case where each of the client terminals 131 to 133 is a terminal dedicated to the XR such as an HMD, a user can operate the virtual object displayed on the display 206 by a finger or fingers recognized by the camera 207. In a case where each of the client terminals 131 to 133 is not a terminal dedicated to the XR, such as a smartphone, a user can operate the virtual object displayed on the display 206 by operating a touch panel of the display 206. The virtual object management system 121 does not necessarily need the camera 207.

A flow of data is controlled via a system bus 201 in the apparatus. A network interface card (NIC) 209 exchanges data with external devices via the interface 208 and the networks 100 to 102. The computer configuration of the virtual object management system 121 is merely an example and not limited to the configuration illustrated in FIG. 2. For example, a storage destination of the data and the programs can be changed to the ROM 204, the RAM 203, or the HDD 205, based on the characteristics of the data and the programs. In addition, processing performed in a software configuration illustrated in FIG. 3 is implemented by the CPU 202 and the GPU 210 executing processing based on the programs stored in the HDD 205.

With reference to FIG. 3 and FIGS. 11A to 11H, the software configuration of the virtual object management system 121 according to the present exemplary embodiment will be described.

Figure 3:
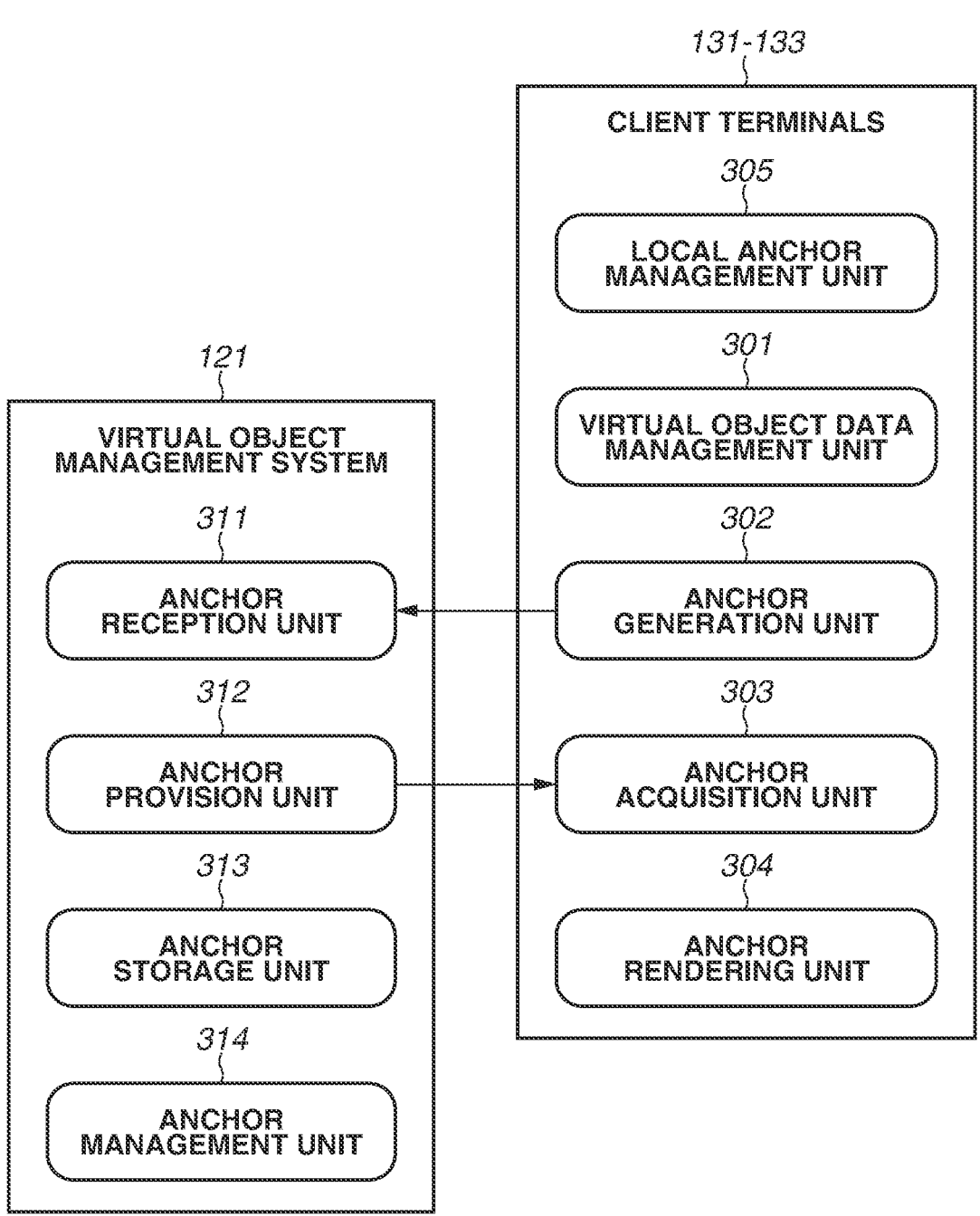
FIG. 3 is a block diagram illustrating a software configuration of the virtual object management system according to the first exemplary embodiment.

FIG. 3 illustrates the software configuration of functions related to the present disclosure and extracted from the virtual object management system 121 according to the present exemplary embodiment.

The virtual object management system 121 includes an anchor reception unit 311, an anchor provision unit 312, an anchor storage unit 313, and an anchor management unit 314.

When the anchor reception unit 311 receives an anchor registration request from any one of the client terminals 131 to 133, the anchor reception unit 311 stores the received anchor information in the anchor storage unit 313 When the anchor provision unit 312 receives an anchor acquisition request from any one of the client terminals 131 to 133, the anchor provision unit 312 searches the anchor storage unit 313 for an anchor satisfying a condition, and returns the found anchor to the corresponding one of the client terminals 131 to 133.

Table 1 illustrates an example of data stored in the anchor storage unit 313.

TABLE 1

| Anchor ID | Session ID | Virtual Object Data | Feature Amount | Position Information | Sensor Information | Priority |
|---|---|---|---|---|---|---|
| a | 111 | aaa.obj | xxx.dat | (20, 20, 5) | Beacon:123 | 1 |
| b | 222 | bbb.obj | yyy.dat | (10, 10, 6) | Beacon:123 | 2 |
| c | 111 | ccc.obj | zzz.dat | (30, 30, 7) | Wi-Fi:345 | 3 |
| d | 333 | ddd.obj | aaa.dat | (10, 10, 1) | Wi-Fi:678 | |
| . | . | . | . | | . | . |
| . | . | . | . | | . | . |
| . | . | . | . | | . | . |

When the anchor reception unit 311 receives the anchor registration request from the one of the client terminals 131 to 133, the anchor reception unit 311 stores a record of the corresponding anchor in the anchor storage unit 313. Each row of an anchor ID column has a piece of unique identification information (ID) for identifying an anchor.

Each row of a session ID column has a same ID for a same session. By associating a plurality of anchors based on a session, a plurality of anchors can be presented to a user at a time. Each row of a virtual object data column has data about a 3-dimensional (3D) model in one of various kinds of formats.

The feature amount for displaying a virtual object indicated by an anchor according to the present exemplary embodiment in association with the real world is managed based on three pieces of information in (1) the feature amount column, (2) the position information column, and (3) the sensor information column illustrated in Table 1.

Each row of the feature amount column indicates a 3-dimensional feature amount of a real world around the position at which the anchor is placed. Each row of the position information column indicates a 3-dimensional position of the virtual object in the real world. Each row of the sensor information column includes position information (global positioning system (GPS) coordinates) indicating a position at which a sensor is placed, and an identifier (ID) included in a signal obtained using a wireless communication function such as Beacon and Wi-Fi associated with the anchor.

In the present exemplary embodiment, the feature amount indicated by the anchor is managed based on three pieces of information in (1) the feature amount column, (2) the position information column, and (3) the sensor information column illustrated in Table 1, but the feature amount of each anchor can be managed using at least one of the three pieces of information, or a combination of a plurality of combinations of the three pieces of information and other information.

The anchor provision unit 312 can return an anchor associated with a specific anchor ID in response to the anchor acquisition request received from any one of the client terminals 131 to 133, and also can return a same session ID or a plurality of anchors associated with a same sensor ID.

In the present exemplary embodiment, the virtual object is managed by further associating priority data with the anchor ID as a parameter for controlling a display relative to other virtual objects when the virtual object is provided. Each row of a priority column has a value indicating a priority for each anchor, and the value can be additionally set for each anchor after the anchor is registered.

The anchor management unit 314 can perform operation on the anchors stored in the anchor storage unit 313, and can additionally set a priority to each anchor stored in the anchor storage unit 313. For example, a numerical value can be set, as a priority, to each row of the priority column as illustrated in Table 1, and a smaller numerical value may indicate a higher priority, or a larger numerical value may indicate a higher priority.

Each of the client terminals 131 to 133 includes a virtual object data management unit 301, an anchor generation unit 302, an anchor acquisition unit 303, an anchor rendering unit 304, and a local anchor management unit 305.

The virtual object data management unit 301 stores 3D model data of various formats. The 3D data stored in the virtual object data management unit 301 is a virtual object that can be placed arbitrarily by a user on the real world in an overlapping manner, and projected and displayed.

Figures 11A, 11B, 11C, 11D:
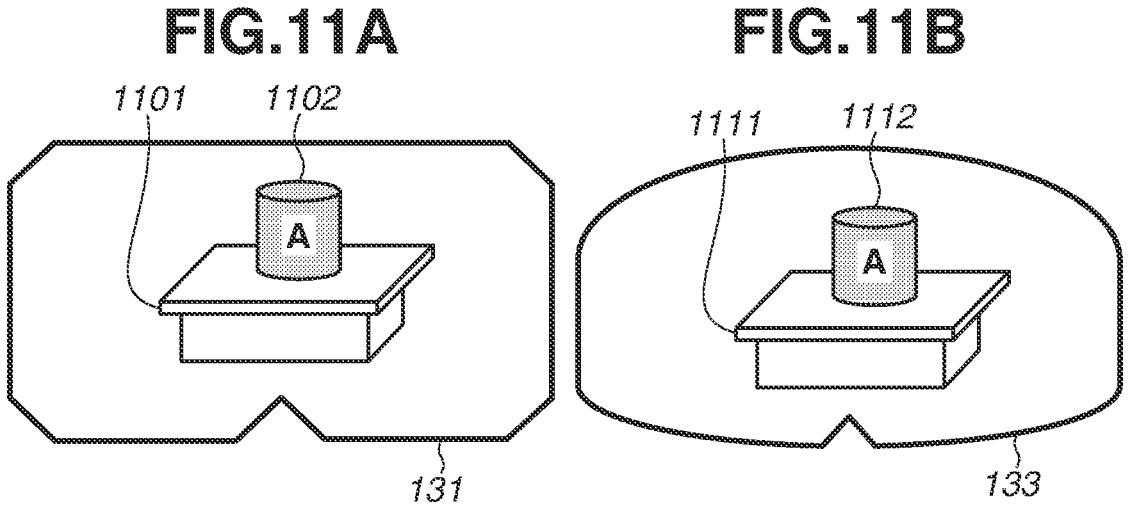

The anchor generation unit 302 performs processing of generating an anchor by a user's operation. A user can select a 3D model stored in the virtual object data management unit 301 via the anchor generation unit 302, and can place the selected 3D model (selected virtual object) on the real world by using a finger or fingers captured by the camera 207 or by operating the touch panel of the display 206. FIGS. 11A to 11H each illustrate an image displayed on the display 206 of each of the HMD type client terminals 131 and 133. As illustrated in FIG. 11A, a user can place, on a desk 1101 in the real world, a cylindrical virtual object 1102 stored in the virtual object data management unit 301 of the client terminal 131 by operating the cylindrical virtual object 1102 in the above-described manner. The anchor generation unit 302 analyzes an image of the surrounding area of the virtual object captured by the camera 207 to extract a feature amount, and stores, in the local anchor management unit 305, the extracted feature amount in association with the virtual object. The anchor generation unit 302 specifies anchor position information using a GPS sensor connected via the interface 208, and associates the anchor position information with the anchor. A user associates the anchor and the sensor via the anchor generation unit 302. The anchor generation unit 302 transmits, to the anchor reception unit 311, the anchor generated as described above and stored in the local anchor management unit 305.

The anchor acquisition unit 303 transmits an anchor acquisition request to the anchor provision unit 312 based on the sensor information about the sensor connected to the interface 208, and stores the anchor acquired from the anchor provision unit 312 in the local anchor management unit 305. The anchor acquisition unit 303 transmits, to the anchor provision unit 312, an acquisition request of an anchor, for example, located near the current position based on a GPS signal, or of an anchor associated with a Wi-Fi or a Beacon when the anchor acquisition unit 303 detects a signal of the Wi-Fi or the Beacon.

The anchor rendering unit 304 compares the feature amount included in each anchor stored in the local anchor management unit 305, and the feature amount of the image of the real world captured by the camera 207, and places the virtual object included in the anchor at a position at which the feature amounts match each other. FIG. 11B illustrates a state where a user renders the cylindrical virtual object 1102 placed on the desk 1101 on the client terminal 131 as illustrated in FIG. 11A, as a cylindrical virtual object 1112, on a desk 1111 with the same feature amount on the client terminal 133.

FIG. 11C illustrates a state where a plurality of anchors is acquired by the anchor acquisition unit 303, and a user renders a plurality of virtual objects 1122 to 1124 on a desk 1121 with the same feature amount. In this case, because the virtual object(B) 1123 is located in front of the virtual object(A) 1122, it is difficult for the user to view the virtual object(A) 1122.

However, there is a case where the user desires to render the virtual object(A) 1122 so that the virtual object (A) is easily viewable more than other virtual objects. For example, there is a case where the user desires most to view the virtual object(A) 1122, or a case where the owner of the desk 1121 desires most to show the virtual object(A) 1122, such as a signboard or an advertisement.

The priority of each anchor is determined based on the priority value included in the anchor stored in the local anchor management unit 305, and the anchor rendering unit 304 controls the rendering of the virtual object based on the priority of each anchor to render the anchor with a high priority to become easily viewable. FIGS. 11D to 11H each illustrate an example of an anchor rendering control based on the priority.

FIGS. 11D to 11H each illustrate an example of rendering the virtual object(A) 1122, the virtual object(B) 1123, and the virtual object(C) 1124 according to the priorities, in a case where the priority of the virtual object(A) 1122 in FIG. 11C is highest.

FIG. 11D illustrates an example of rendering a virtual object with the highest priority in front of the other virtual objects. A virtual object(A) 1132 with the highest priority is rendered in front of a virtual object(B) 1133 and a virtual object(C) on a desk 1131 so that the virtual object(A) 1132 becomes easily viewable.

FIG. 11E illustrates an example of rendering only a virtual object with the highest priority in a case where other virtual objects overlapping a virtual object with a higher priority are present. Only a virtual object(A) 1142 with the highest priority is rendered on a desk 1141 so that the virtual object(A) 1142 becomes easily viewable.

FIG. 11F illustrates an example of rendering other virtual objects to be transparent, in a case where the other virtual objects overlapping a virtual object with the highest priority are present. A virtual object(B) 1153 and a virtual object(C) 1154 each with a priority lower than that of a virtual object(A) 1152 to be transparent are rendered on a desk 1151 so that the virtual object(A) 1152 becomes easily viewable.

FIG. 11G illustrates an example of rendering a virtual object with a higher priority for a longer period by switching the rendering period of the virtual object. A time table dialog 1163 is a table illustrating a period for displaying each virtual object, and the rendering period is switched according to the table. A time table 1164 indicates a display period of a virtual object(A) 1162, a time table 1165 indicates a display period of a virtual object(B), and a time table 1166 indicates a display period of a virtual object(C). The period in each time table is set by the local anchor management unit 305 or the anchor rendering unit 304 so that the period becomes longer as the priority is higher. The anchor rendering unit 304 renders the virtual object(A) 1162 for 20 seconds, the virtual object(B) for 10 seconds, and the virtual object(C) for 5 seconds, according to the corresponding time table. The virtual object(A) 1162 with the highest priority is displayed on a desk 1161 for the longest period so that the virtual object(A) 1162 becomes easily viewable. The time table dialog 1163 may be or not may be rendered on the display 206.

FIG. 11H illustrates an example of not rendering a virtual object in a case where a virtual object with a low priority is present in a specific area. A boundary plane 1174 indicates a boundary of an anchor rendering feasible area, and the anchor rendering unit 304 can render the anchor with a low priority only in a space determined by the boundary plane 1174. In the anchor list of Table 1, assume that anchor ID=a indicates the virtual object(A), that anchor ID=b indicates the virtual object(B), and that anchor ID=c indicates the virtual object(C). Assume that the boundary plane 1174 is a plane with position information y=20, and that the anchor rendering unit 304 does not render the virtual object in a space with the position information y<20. The anchors with the position information y<20 includes a virtual object(A) 1172 and a virtual object(B), and because the virtual object (B) with a low priority is not rendered, only the virtual object(A) 1172 is rendered on a desk 1171. A virtual object(C) 1173 is rendered on the desk 1171 because the virtual object(C) 1173 is low in priority but the position information does not satisfy y<20. None of the virtual objects in a space in which the virtual objects to be rendered overlap the virtual object(A) 1172 with a high priority are rendered so that the virtual object(A) 1172 becomes easily viewable. The boundary plane 1174 may be or not may be rendered on the display 206.

FIGS. 11A to 11H illustrate the examples of controlling the rendering of the virtual object according to the priority, and the present disclosure is not limited to the examples illustrated in FIGS. 11A to 11H, as long as the rendering control can be performed according to the priority.

With reference to FIGS. 4, 5, 6, 7A, 7B, and 8, a description will of a flow diagrams to cause display of an anchor generated by the client terminal 131 on the client terminal 133 other than the client terminal 131.

Figure 4:
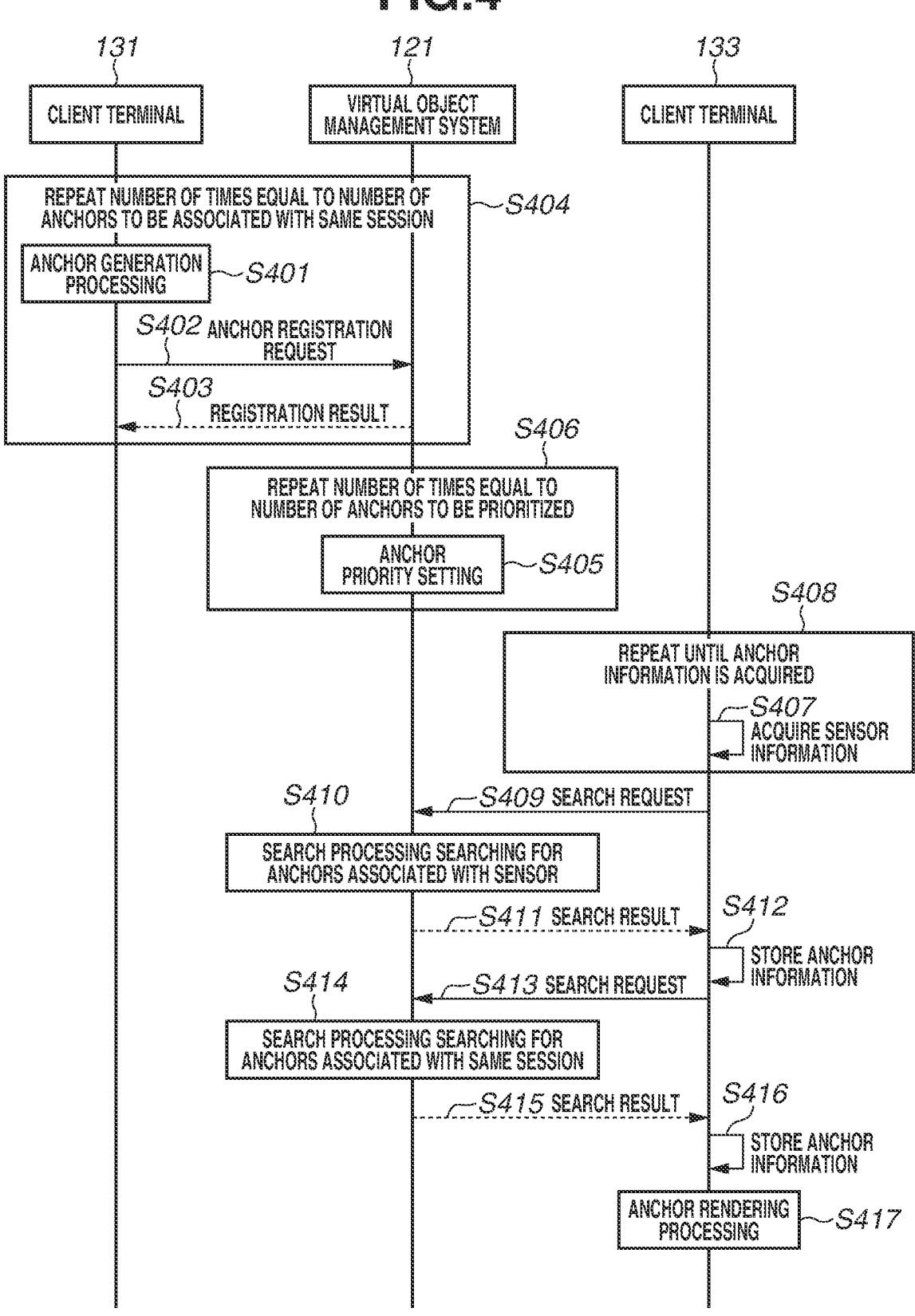
FIG. 4 is a sequence diagram illustrating a processing flow of sharing a virtual object with a plurality of terminals in the virtual object management system according to the first exemplary embodiment.

FIG. 4 illustrates a sequence from when an anchor generated by the client terminal 131 is registered to the virtual object management system 121 to when the client terminal 133 acquires and displays the anchor stored in the virtual object management system 121.

First, a description will be given of a sequence of registering an anchor by operating the client terminal 131 to be performed in steps S401 to S403 in FIG. 4. In step S401, a user operates the client terminal 131 to place a virtual object stored in the virtual object data management unit 301 to generate an anchor, via the anchor generation unit 302, and to store the generated anchor in the local anchor management unit 305. In step S402, the anchor generation unit 302 transmits an anchor registration request for the generated anchor to the anchor reception unit 311. In step S403, upon receiving the anchor registration request, the anchor reception unit 311 stores the received anchor in the anchor storage unit 313, and then returns the storage result to the anchor generation unit 302. In a case where a plurality of anchors is to be registered with a same session ID, steps S401 to S403 are repeated in step 404.

Figure 5:
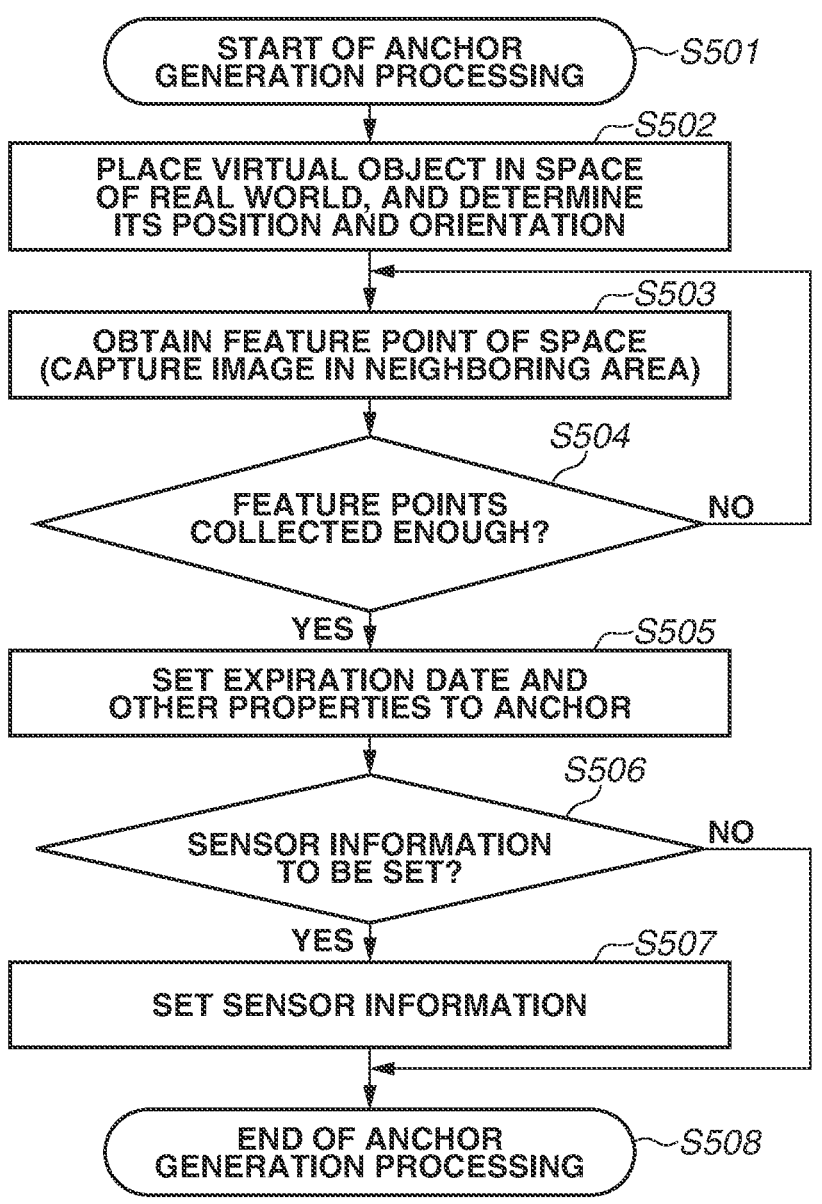
FIG. 5 is a flowchart illustrating a processing flow of generating an anchor according to the first exemplary embodiment.

With reference to FIG. 5, a description will be given of a detailed processing flow to be performed by the anchor generation unit 302 in the anchor generation processing of step S401 in FIG. 4. In step S501, the anchor generation processing starts. In step S502, the anchor generation unit 302 places a virtual object in a space of the real world by a user's operation, and determines its position and orientation. In step S503, the anchor generation unit 302 captures an image of the surrounding area by the camera 207, to obtain a three-dimensional feature point of the space. In step S504, in a case where the anchor generation unit 302 determines that the feature points are not collected enough (NO in step S504), the processing returns to step S503 to obtain a feature point again. In step S504, in a case where the anchor generation unit 302 determines that the feature points are collected enough (YES in step S504), the processing proceeds to step S505. In step S505, the anchor generation unit 302 prompts a user to set an expiration date and other required properties. In step S506, in a case where sensor information is not to be set to the anchor (NO in step S506), the processing proceeds to step S508. In step S508, the processing ends. In step S506, in a case where the sensor information is to be set to the anchor (YES in step S506), the processing proceeds to step S507. In step S507, the anchor generation unit 302 prompts the user to set the sensor information corresponding to a type of the sensor, and after the sensor information is set by the user, the processing proceeds to step S508. In step S508, the processing ends. For example, in step S507, the anchor generation unit 302 associates a Beacon having an ID=123 with the anchor information, as the data with the anchor ID=a in Table 1, following the user's operation.

That is all the sequence of registering the anchor to the virtual object management system 121 by operating the client terminal 131.

A description will be given of a sequence of setting a priority to an anchor stored in the anchor storage unit 313 to be performed in steps S405 and S406 in FIG. 4.

Figure 6:
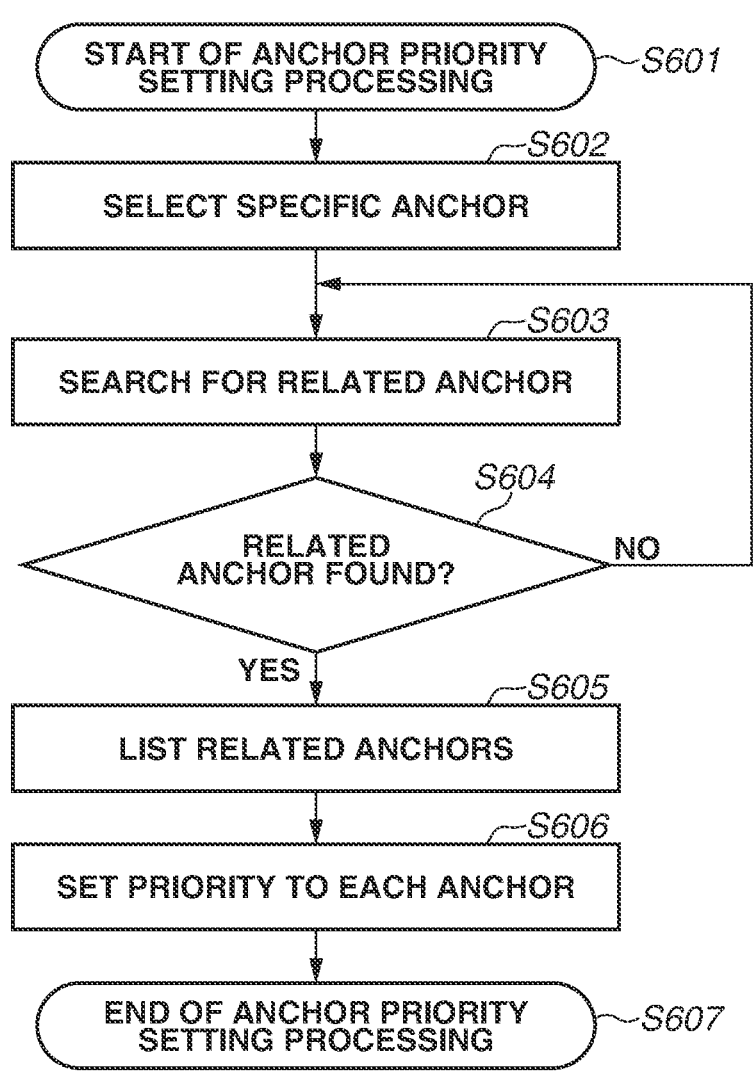
FIG. 6 is a flowchart illustrating a processing flow of setting a priority to each anchor stored in the virtual object management system according to the first exemplary embodiment.

In step S405, the user operates the virtual object management system 121 to perform an additional setting of a priority through the anchor management unit 314 on an anchor stored in the anchor storage unit 313. In step S406, in a case where the priorities are set to a plurality of anchors, the processing in S405 is repeated. With reference to FIG. 6, a description will be given of the anchor priority setting to be performed in step S405 in FIG. 4 for setting a priority to each anchor stored in the anchor storage unit 313.

In step S601, the anchor priority setting processing starts. In step S602, the user selects an anchor stored in the anchor storage unit 313 by a user's operation on the virtual object management system 121. In step S603, the anchor management unit 314 searches the anchor storage unit 313 for an anchor related to the anchor selected by the user.

The related anchor in this case indicates an anchor of which any one of the session ID, the feature amount, and the sensor information in Table 1 matches or similar to that of the selected anchor. In step S604, in a case where an anchor related to the anchor selected by the user is found in the anchors stored in the anchor storage unit 313 (YES in step S604), the processing proceeds to step S605. In step S605, the related anchors are listed. In step S606, the user sets a priority to each anchor stored in the anchor storage unit 313 via the anchor management unit 314 for each of the anchors listed in step S605. Then, in step S607, the processing ends. When Table 1 is used as an example, in a case where the user selects the anchor with the "anchor ID=a" in step S602, then in step S603, the anchor with the "anchor ID=b" matching the selected anchor in the sensor information, and the anchor with the "anchor ID=c" matching the selected anchor in the session information, are found. In step S606, for each of the anchors with the "anchor ID=a, b, and c" listed in step S605, the user sets a priority 1 to the anchor with the "anchor ID=a", a priority 2 to the anchor with the "anchor ID=b", and a priority 3 to the anchor with the "anchor ID=c".

A description will be given of a sequence of acquiring and rendering an anchor by the user operating the client terminal 133 to be performed in steps S407 to S416 in FIG. 4.

In step S407, the anchor acquisition unit 303 acquires sensor information. In step S408, in a case where the anchor acquisition unit 303 cannot acquire the senor information, the anchor acquisition unit 303 repeats the processing in step S407. The sensor information is acquired by the anchor acquisition unit 303 via a sensor for detecting a Bluetooth signal, which is connected to the client terminal 133 via the interface 208. In step S409, in a case where the sensor detects a signal, for example, from a Beacon terminal with the "ID=123", the anchor acquisition unit 303 transmits, to the anchor provision unit 312, a search request to search for an anchor associated with the Beacon terminal with the "ID=123". In step S410, the anchor provision unit 312 searches the anchor storage unit 313 for anchors associated with the Beacon terminal with the "ID =123". In step S411, because two anchors with the "anchor ID=a" and the "anchor ID =b" are found as the anchors associated with the Beacon terminal with the"ID =123", the anchor provision unit 312 returns the anchors with the "anchor ID=a" and the anchor with the "anchor ID=b" to the anchor acquisition unit 303. In step S412, the anchor acquisition unit 303 stores the anchors returned by the anchor provision unit 312 in the local anchor management unit 305. In step S413, the anchor acquisition unit 303 further transmits a search request to search for anchors associated with the same session for each anchor to the anchor provision unit 312. More specifically, in step S413, the anchor acquisition unit 303 transmits to the anchor provision unit 312 a search request to search for anchors with a "session ID=111" that is the same session ID with the anchor with the "anchor ID=a". In step S414, the anchor provision unit 312 searches the anchor storage unit 313 for anchors with the "session ID=111". In step S415, the anchor provision unit 312 returns the found anchors to the anchor acquisition unit 303. More specifically, since the anchor with the "session ID=111" is the anchor with the "anchor ID=d", in step S415, the anchor provision unit 312 returns the anchor with the "anchor ID=d" to the anchor acquisition unit 303. In step S416, the anchor acquisition unit 303 stores the anchor returned by the anchor provision unit 312 in the local anchor management unit 305. In step S417, the anchor rendering unit 304 performs anchor rendering processing on the anchors stored in the local anchor management unit 305.

Descriptions will be given of detailed processing flows of the anchor search processing to be performed in step S410 to search for anchors associated with a sensor, and of the anchor search processing to be performed in step S414 to search for anchors associated with a same session, with reference to flowcharts illustrated in FIGS. 7A and 7B.

Figure 7A:
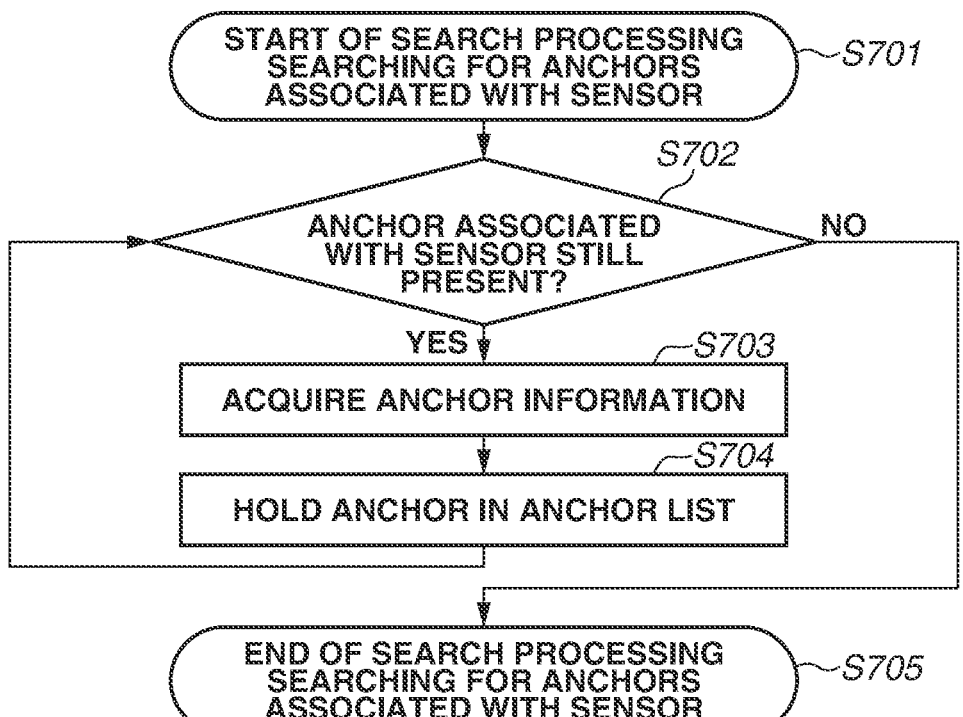
FIGS. 7A and 7B are flowcharts each illustrating a processing flow of searching for anchors to be performed by the virtual object management system according to the first exemplary embodiment.
Figure 7B:
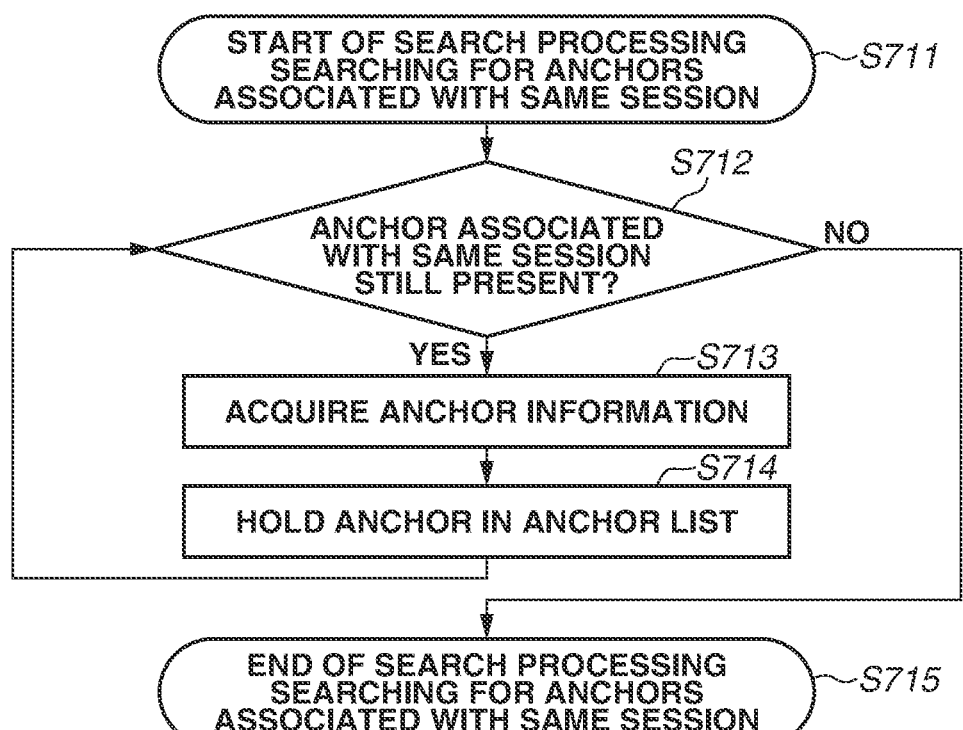

FIG. 7A is a flowchart illustrating the anchor search processing to be performed by the anchor provision unit 312 in step S410 to search for anchors associated with a sensor. In step S701, the search processing to search for anchors associated with a sensor starts. In step S702, the anchor provision unit 312 checks whether an anchor associated with the sensor included in the anchor acquisition request transmitted from the anchor acquisition unit 303 is still present in Table 1 stored in the anchor storage unit 313. In step S702, in a case where the anchor associated with the sensor is not present (NO in step S702), the processing proceeds to step S705. In step S705, the anchor provision unit 312 ends the processing. In step S702, in a case where the anchor associated with the sensor is present (YES in step S702), the processing proceeds to step S703. In step S703, the anchor provision unit 312 acquires the anchor from the anchor storage unit 313. In step S704, the anchor provision unit 312 holds the anchor acquired in step S703 in the anchor list, and the processing returns to step S702. FIG. 7B is a flowchart illustrating the anchor search processing to be performed by the anchor provision unit 312 in step S414 to search for anchors associated with a same session. In step S711, the search processing to search for anchors associated with a same session starts. In step S712, the anchor provision unit 312 checks whether an anchor associated with a session ID included in the anchor acquisition request transmitted from the anchor acquisition unit 303 is still present in Table 1 stored in the anchor storage unit 313. In step S712, in a case where the anchor associated with the session ID is not present (NO in step S712), the processing proceeds to step S715. In step S715, the anchor provision unit 312 ends the processing. In step S712, in a case where the anchor associated with the session ID is still present (YES in step S712), the processing proceeds to step S713. In step S713, the anchor provision unit 312 acquires the anchor from the anchor storage unit 313. In step S714, the anchor provision unit 312 holds the anchor acquired in step S713 in the anchor list, and the processing returns to step S712. In both cases of the anchor search processing to search for the anchors associated with the sensor to be performed in step S410 and of the anchor search processing to search for the anchors associated with the same session to be performed in step S414, the anchor provision unit 312 returns only the anchors held in the anchor list in step S704 and in step S714, to the anchor acquisition unit 303.

Figure 8:
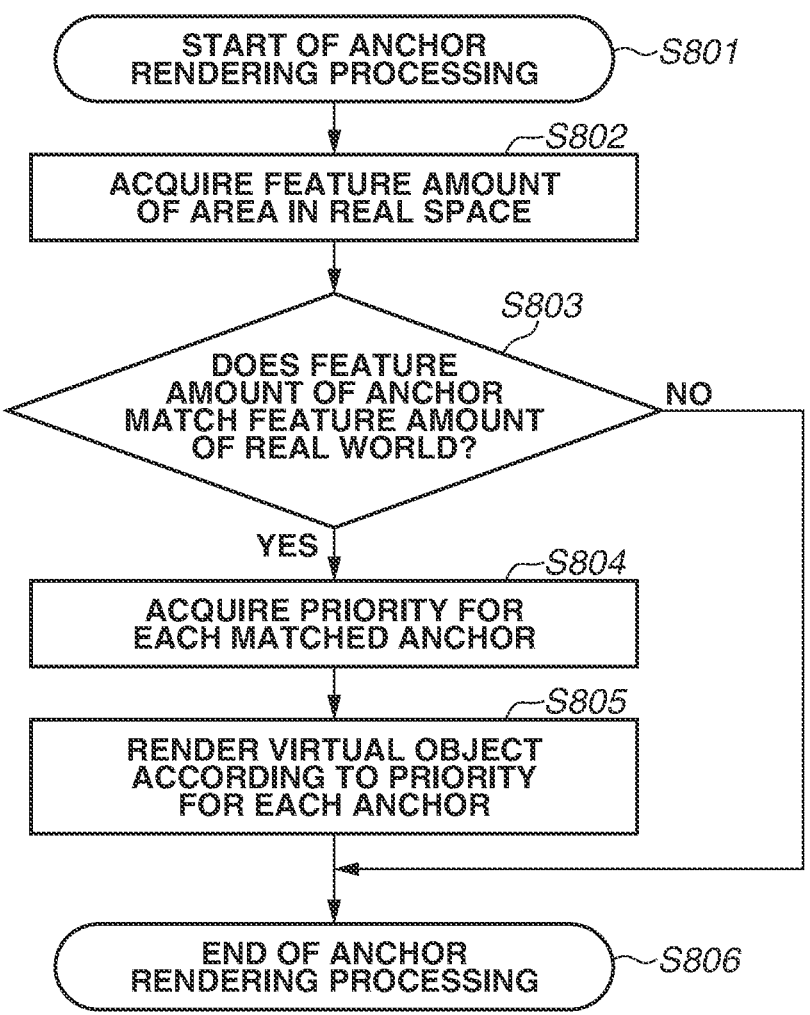
FIG. 8 is a flowchart illustrating a processing flow of rendering virtual objects to be performed by a client terminal according to the first exemplary embodiment.

FIG. 8 is a flowchart illustrating the anchor rendering processing to be performed by the client terminal 133 in step S417. In step S801, the anchor rendering processing starts. In step S802, the anchor rendering unit 304 acquires a feature amount of an area in the real space from an image captured by the camera 207. In step S803, the anchor rendering unit 304 checks whether the acquired feature amount matches the feature amount of each anchor stored in the local anchor management unit 305. In step S803, in a case where the feature amounts do not match each other (NO in step S803), the processing proceeds to step S806. Then, in step S806, the anchor rendering unit 304 ends the anchor rendering processing of step S417. In step S803, in a case where the feature amounts match each other (YES in step S803), the processing proceeds to step S804. In step S804, the anchor rendering unit 304 acquires a priority for each matched anchor. In step S805, the anchor rendering unit 304 renders the virtual objects according to the priority for each anchor. Then, in step S806, the anchor rendering processing ends. The rendering of the virtual objects according to the priority for each anchor in step S805 is performed by a rendering method illustrated in each of FIGS. 11D to 11H, as an example.

By the above-described method, it is possible to make the virtual object with a high priority become easily viewable by prioritizing the virtual objects and controlling the rendering of the virtual objects according to the priorities.

In this way, a user can make the virtual object that the user desires to show become easily viewable or the virtual object that the user desires to see become easily viewable.

Next, a second exemplary embodiment will be described. In the first exemplary embodiment, there is a case where a user desires to determine the priority based on the user's feedback, not rendering the virtual object according to the determined priority. For example, the priority of an anchor with a high average score of word-of-mouth scores or an anchor with a large number of high evaluation scores is set to high, by using the word-of-mouth scores or the high evaluation scores given by the users to the anchor.

In the present exemplary embodiment, in addition to the virtual objects, an evaluation dialog is displayed on the display 206 (described below). By the user inputting the evaluation to the evaluation dialog, each of the client terminals 131 to 133 transmits the evaluation to the virtual object management system 121.

The present exemplary embodiment has many duplicate portions with the first exemplary embodiment, and thus only different portions will be described.

Table 2 illustrates an example of data stored in the anchor storage unit 313.

TABLE 2

| Anchor ID | Session ID | Virtual Object Data | Feature Amount | Position Information | Sensor Information | Evaluation Score |
|---|---|---|---|---|---|---|
| a | 111 | aaa.obj | xxx.dat | (20, 20, 5) | Beacon:123 | 5 |
| b | 222 | bbb.obj | yyy.dat | (10, 10, 6) | Beacon:123 | 4 |
| c | 111 | ccc.obj | zzz.dat | (30, 30, 7) | WiFi:345 | 3 |
| d | 333 | ddd.obj | aaa.dat | (10, 10, 1) | WiFi:678 | 1 |
| . | . | . | . | | . | . |
| . | . | . | . | | . | . |
| . | . | . | . | | . | . |

In the present exemplary embodiment, the virtual object is managed by further associating an evaluation score in each row of an evaluation column with the anchor ID as a parameter for controlling a display relative to other virtual objects when the virtual object is provided. The evaluation score indicates information obtained by quantifying the evaluation performed on the virtual object. Table 2 is the same as Table 1 in definitions of the corresponding columns other than the evaluation score column. An evaluation score input by the user is stored in each row of the evaluation score column in Table 2.

Although not illustrated in Table 2, both of the priority column and the evaluation score column can be managed. In this case, if virtual objects have an equal priority, it is possible to control the virtual object with the higher evaluation score to be preferentially displayed. Values can be arbitrarily set for the columns, and in a case where the values in one of the columns do not exist, the information in the other column can be used for the display control.

Figure 12A:
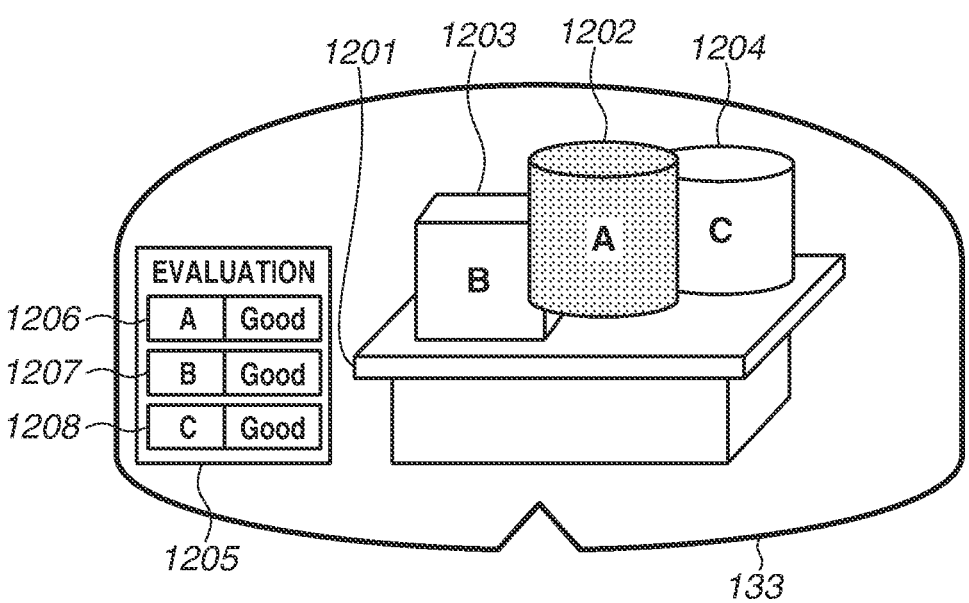
FIGS. 12A and 12B are screen examples displayed on the client terminals according to the second exemplary embodiment.
Figure 12B:
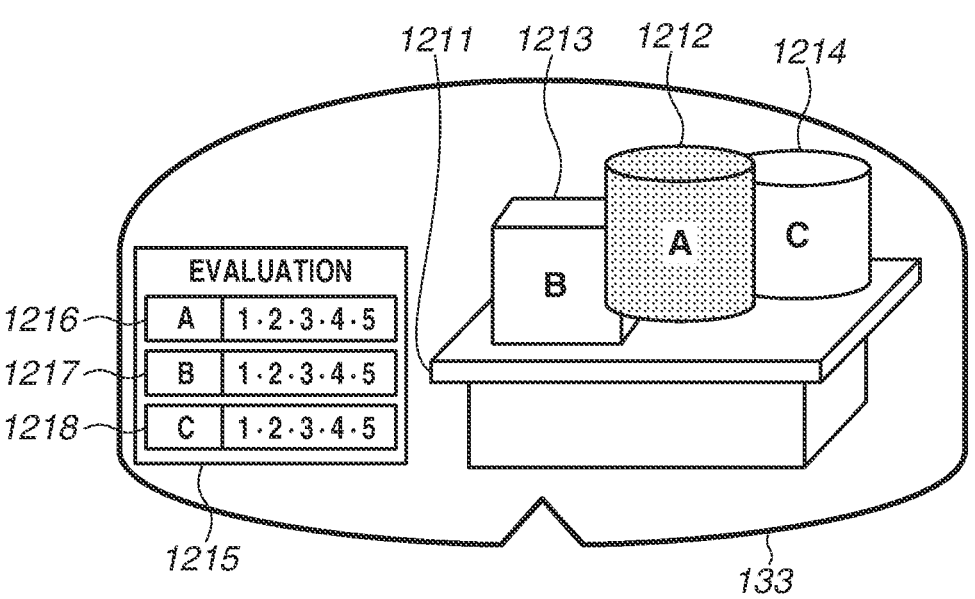

FIGS. 12A and 12B each illustrate an image viewed on the display 206 of each of the client terminals 131 to 133 according to the present exemplary embodiment.

FIGS. 12A is an example of adding an evaluation score to each anchor. An evaluation dialog 1205 is a dialog for inputting an evaluation to each of virtual objects 1202 to 1204 on a desk 1201. An input window 1206 is an input window for the virtual object(A) 1202, an input window 1207 is an input window for the virtual object(B) 1203, and an input window 1208 is an input window for the virtual object(C) 1204. By selecting "Good" for each of the input window 1206 to 1208, an evaluation score is added to the corresponding virtual object.

FIG. 12B is an example of inputting an evaluation score to each anchor. An evaluation dialog 1215 is a dialog for inputting an evaluation to each of virtual objects 1212 to 1214 on a desk 1211. An input window 1216 is an input window for the virtual object(A) 1212, an input window 1217 is an input window for the virtual object(B) 1213, and an input window 1218 is an input window for the virtual object(C) 1214. By selecting an evaluation score for each of the input windows 1216 to 1218, a user can input the selected evaluation score to the corresponding virtual object.

Each of FIGS. 12A and 12B is just an example for assigning the evaluation score to each anchor, and the present disclosure is not limited to the examples in FIGS. 12A and 12B, as long as the evaluation for each anchor can be performed.

FIG. 9A is a flowchart illustrating the anchor rendering processing to be performed by each of the client terminals 131 to 133 according to the second exemplary embodiment. In step S901, the anchor rendering processing starts. In step S902, the anchor rendering unit 304 acquires a feature amount of an area in the real space from an image captured by the camera 207. In step S903, the anchor rendering unit 304 checks whether the acquired feature amount matches the feature amount of each anchor stored in the local anchor management unit 305.

In step S903, in a case where the feature amounts do not match each other (NO in step S903), the processing proceeds to step S908. In step S908, the anchor rendering unit 304 ends the anchor rendering processing. In step S903, in a case where the feature amounts match each other (YES in step S903), the processing proceeds to step S904. In step S904, the anchor rendering unit 304 acquires the priority for each matched anchor. In step S905, the anchor rendering unit 304 renders the virtual objects according to the evaluation score for each anchor. The rendering of the virtual objects according to the evaluation score for each anchor in step S905 is performed by a rendering method illustrated in each of FIGS. 11D to 11H, as an example. Then, in step S906, the user inputs an evaluation score for each anchor via the interface 208. In step S907, the client terminal 133 transmits the input evaluation score to the virtual object management system 121. Then, in step S908, the processing ends.

FIG. 9B is a flowchart illustrating evaluation score update processing to be performed by the virtual object management system 121 according to the second exemplary embodiment. In step S911, the evaluation score update processing starts. In step S912, the virtual object management system 121 receives the evaluation score for the anchor from each of the client terminals 131 to 133. In step S913, the virtual object management system 121 updates the evaluation score for each anchor stored in the anchor storage unit 313. Then, in step S914, the processing ends. For example, the update is a calculation of adding the evaluation score or of the average score of the evaluation scores.

In the present exemplary embodiment, the evaluation score is input by the user as the examples illustrated in FIGS. 12A and 12B. However, the evaluation score may be obtained based on the number of times of rendering the virtual object or the number of times of giving a line-of-sight to the virtual object.

According to the present exemplary embodiment, the user's feedback is transmitted to the virtual object management system 121, so that the priority is determined based on the user's feedback, and the rendering control of the virtual object can be performed.

In the first exemplary embodiment, there may be a case where a user desires to render a favorite anchor regardless of the priority. For this reason, a creator column, a created date column, and a tag column are prepared as anchor properties, and the anchor properties are selectively used so that a user's favorite anchor can be obtained. For example, a user can obtain anchors of the user's favorite creator by adding a creator of an anchor to the property of the anchor.

A third exemplary embodiment has many duplicate portions with the first exemplary embodiment, and thus only different portions will be described.

Table 3 illustrates an example of property data stored in the anchor storage unit 313.

TABLE 3

| Anchor ID | Creator | Created Date | Tag | ... |
|---|---|---|---|---|
| a | Tanaka | Nov. 10, 2021 | Advertising | ... |
| b | Sato | Sep. 11, 2021 | Character | ... |
| c | Suzuki | Oct. 10, 2020 | Artist | ... |
| d | Yamamoto | Nov. 10, 2020 | Animation | ... |
| . | . | . | . | |
| . | . | . | . | |
| . | . | . | . | |

In the present exemplary embodiment, the virtual object is managed by further associating the property data with the anchor ID as a parameter for controlling a display relative to other virtual objects when the virtual object is provided. Although not illustrated in Table 3, the session ID column, the virtual object data column, the feature amount column, the position information column, and the sensor information column included in each of Table 1 and Table 2 are managed in each record. The evaluation score column may be included.

Although not illustrated in Table 2, both of the priority column and the evaluation score column can be managed. In this case, if virtual objects have an equal priority, it is possible to control the virtual object with a higher evaluation score to be preferentially displayed. Values can be arbitrarily set for the columns, and in a case where the values in one of the columns do not exist, the information in the other column can be used for the display control.

Each anchor includes property data in Table 3 in addition to the data in Table 1.

The virtual object management system 121 transmits only the anchors including the property designated by the user to the client terminal 133 in steps S411 and S415, by adding the property conditions designated by the user in steps S409 and S413 to the respective search requests. In this way, the user can view only the favorite anchors.

FIG. 10A is a flowchart illustrating the anchor search processing to search for anchors associated with a sensor to be performed by the anchor provision unit 312 in step S410 according to the third exemplary embodiment. In step S1001, the search processing to search for anchors associated with a sensor starts. In step S1002, the anchor provision unit 312 checks whether an anchor associated with the sensor included in the anchor acquisition request transmitted from the anchor acquisition unit 303 is still present in Table 1 stored in the anchor storage unit 313. In step S1002, in a case where the associated anchor is not present (NO in step S1002), the processing proceeds to step S1006. In step S1006, the anchor provision unit 312 ends the processing. In step S1002, in a case where the associated anchor is present (YES in step S1002), the processing proceeds to step S1003. In step S1003, the anchor provision unit 312 acquires the anchor from the anchor storage unit 313. In step S1004, in a case where the acquired anchor does not satisfy the property condition designated by the user (NO in step S1004), the processing proceeds to step S1006. In step S1006, the anchor provision unit 312 ends the processing. In step S1004, in a case where the acquired anchor satisfies the property condition designated by the user (YES in step S1004), the processing proceeds to step S1005. In step S1005, the anchor provision unit 312 holds the anchor acquired in step S1003 in the anchor list, and the processing returns to step S1002. Examples of the property condition designated by the user include a full match with the property, a partial match, and a clock time magnitude comparison result.

FIG. 10B is a flowchart illustrating the anchor search processing to search for anchors associated with a same session to be performed by the anchor provision unit 312 in step S414 according to the third exemplary embodiment. In step S1011, the search processing to search for anchors associated with a same session starts. In step S1012, the anchor provision unit 312 checks whether an anchor associated with a session ID included in the anchor acquisition request transmitted from the anchor acquisition unit 303 is still present in Table 1 stored in the anchor storage unit 313. In step S1012, in a case where the anchor associated with the session ID is not present (NO in step S1012), the processing proceeds to step S1016. In step S1016, the anchor provision unit 312 ends the processing. In step S1012, in a case where the anchor associated with the session ID is present (YES in step S1012), the processing proceeds to step S1013. In step S1013, the anchor provision unit 312 acquires the anchor from the anchor storage unit 313. In step S1014, in a case where the acquired anchor satisfies the property condition designated by the user (YES in step S1014), the processing proceeds to step S1015. In step S1015, the anchor provision unit 312 holds the anchor acquired in step S1013 in the anchor list, and the processing returns to step S1012. In both cases of the anchor search processing to be performed in step S410 to search for the anchors associated with the sensor, and of the anchor search processing to be performed in step S414 to search for the anchors associated with the same session, the anchor provision unit 312 returns, to the anchor acquisition unit 303, only the anchors held in the anchor list in steps S1005 and S1015.

The property set to the anchor is not limited to the properties included in Table 3.

As illustrated in the present exemplary embodiment, the properties are prepared for the anchors, and the user can display only favorite anchors by selectively using the properties.

The present disclosure includes an apparatus, a system, and a method, configured by combining the above-described exemplary embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can provide a system capable of providing appropriate information, even in a case where a plurality of virtual objects is placed at a specific position in the real world.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-039856, filed Mar. 15, 2022, which is hereby incorporated by reference herein in its entirety.

What is claimed is:

1. A system for managing a virtual object, the system comprising:

at least one processor; and at least one memory that is in communication with the at least one processor, wherein the at least one memory stores instructions for causing the at least one processor and the at least one memory to:

receive information that indicates a virtual object and a position where the virtual object is placed within a real world, after receiving the information, obtain a feature amount of the real world in an area of the real world that surrounds the position, wherein the feature amount of the real world is obtained from a device that senses the feature amount of the real world, associate the feature amount of the real world in the area of the real world that surrounds the position with identification information that indicates the virtual object, and associate, with the identification information that indicates the virtual object, a parameter used to control display of the virtual object relative to another virtual object when the virtual object is displayed by one or more of a plurality of terminals.

2. The system according to claim 1, wherein the parameter includes priority information for determining how to prioritize the virtual object relative to the other virtual object when the virtual object is displayed in the real world.

3. The system according to claim 1, wherein the parameter includes information obtained by quantifying an evaluation performed on the virtual object, and wherein the information is used for determining how to prioritize the virtual object relative to the other virtual object when the virtual object is displayed in the real world.

4. The system according to claim 1, wherein the at least one memory further stores instructions for causing the at least one processor and the at least one memory to:

in response to a request received from the one or more of the plurality of terminals and generated using at least one of the identification information and the feature amount in the real world, return, as a response, information about the virtual object based on at least one of the identification information and the feature amount, and wherein the virtual object is projected onto the real world by the one or more of the plurality of terminals based on the parameter and the returned information about the virtual object.

5. The system according to claim 4, wherein each of the plurality of terminals includes a respective head mounted display.

6. The system according to claim 1, wherein the feature amount of the real world in the area of the real world that surrounds the position includes three-dimensional position information of the real world.

7. The system according to claim 1, wherein the feature amount of the real world in the area of the real world that surrounds the position includes sensor information that indicates a position of a sensor and an identifier associated with the virtual object.

8. The system according to claim 1,
wherein the position where the virtual object is placed within the real world is indicated by three-dimensional coordinates, and
wherein the feature amount of the real world is three dimensional.

9. The system according to claim 1, wherein the information further indicates an orientation of the virtual object within the real world.

10. The system according to claim 1, wherein the at least one memory further stores instructions for causing the at least one processor and the at least one memory to:
receive a respective second feature amount of the real world from at least two terminals of the plurality of terminals,
select the virtual object based on the feature amount of the real world in the area of the real world that surrounds the position, on the identification information that indicates the virtual object, and on the second feature amounts, and
after selecting the virtual object, transmit information for rendering the virtual object and information indicating where the virtual object is placed within the real world to the at least two terminals.

11. The system according to claim 1, wherein the device that senses the feature amount of the real world is one of the plurality of terminals.

12. A method for a system that manages a virtual object, the method comprising:
receiving information that indicates a virtual object and a position where the virtual object is placed within a real world;
after receiving the information, obtaining a feature amount of the real world in an area of the real world that surrounds the position, wherein the feature amount of the real world is obtained from a device that senses the feature amount of the real world;
associating the feature amount of the real world in the area of the real world that surrounds the position with identification information that indicates the virtual object;
associating, with the identification information that indicates the virtual object, a parameter used to control display of the virtual object relative to another virtual object when the virtual object is displayed by one or more of a plurality of terminals.

13. A terminal configured to project a virtual object onto a real world, the terminal comprising:
a sensor that is configured to sense a feature amount of a real world;

a transmission unit configured to transmit a request that includes the feature amount of the real world being captured by the sensor at a position where a virtual object is placed within the real world, to a system that manages the virtual object by associating the virtual object and the feature amount with one another;
a reception unit configured to receive information about the virtual object from the system in response to the request; and
a projection unit configured to project the virtual object onto the real world at the position where the virtual object is placed based on the received information,
wherein the virtual object is projected onto the real world based on a parameter for controlling display of the virtual object relative to another virtual object, and
wherein the parameter is managed by the system in association with the virtual object.

14. The terminal according to claim 13,
wherein the feature amount includes an identifier included in a signal transmitted using a wireless communication function usable by the terminal.

15. A method for a terminal configured to project a virtual object onto a real world, the method comprising:
transmitting a request that includes a feature amount of a real world being captured by a sensor of a terminal that senses the feature amount of the real world at a position where a virtual object is placed within the real world, to a system configured to manage the virtual object by associating the virtual object and the feature amount with one another;
receiving information about the virtual object from the system in response to the request; and
projecting the virtual object onto the real world at the position where the virtual object is placed based on the received information,
wherein the virtual object is projected onto the real world based on a parameter for controlling display of the virtual object relative to another virtual object, and
wherein the parameter is managed by the system in association with the virtual object.

16. A non-transitory storage medium storing a computer-executable program to execute a method for projecting a virtual object onto a real world, the method comprising:
transmitting a request that includes a feature amount of a real world being captured by a sensor of a terminal that senses the features amount of the real world at a position where a virtual object is placed within the real world, to a system configured to manage the virtual object by associating the virtual object and the feature amount with one another;
receiving information about the virtual object from the system in response to the request; and
projecting the virtual object onto the real world at the position where the virtual object is placed based on the received information,
wherein the virtual object is projected onto the real world based on a parameter for controlling display of the virtual object relative to another virtual object, and
wherein the parameter is managed by the system in association with the virtual object.

* * * * *